United States Patent [19]

Marshall, Sr.

[11] 4,307,375
[45] Dec. 22, 1981

[54] TOP WATCHER WARNING DEVICE FOR TRUCKS AND THE LIKE

[76] Inventor: James A. Marshall, Sr., 106-17 Corona Ave., Corona, N.Y. 11368

[21] Appl. No.: 820,939

[22] Filed: Aug. 1, 1977

Related U.S. Application Data

[63] Continuation-in-part of Ser. No. 662,329, Mar. 1, 1976, abandoned.

[51] Int. Cl.² .................. G08B 21/00; H01H 3/16
[52] U.S. Cl. .................................. 340/61; 200/61.44
[58] Field of Search .................... 340/52 R, 61; 200/61.42, 61.44

[56] References Cited

U.S. PATENT DOCUMENTS

| | | | |
|---|---|---|---|
| 2,520,305 | 8/1950 | Campbell | 340/61 |
| 2,554,371 | 5/1951 | Marx | 340/61 X |
| 2,812,397 | 11/1957 | Taylor | 200/61.44 |
| 2,834,002 | 5/1958 | Nordsiek | 340/61 |
| 2,847,527 | 8/1958 | Wolters | 340/61 X |
| 2,894,087 | 7/1959 | Kramer | 340/61 X |
| 3,232,265 | 2/1966 | Hurt | 340/61 X |
| 3,269,783 | 8/1966 | Kriz | 340/61 X |
| 3,488,461 | 1/1970 | Webb | 200/61.42 |
| 3,996,950 | 12/1976 | Mier | 200/61.44 X |

Primary Examiner—John W. Caldwell, Sr.
Assistant Examiner—Joseph E. Nowicki
Attorney, Agent, or Firm—Richard L. Miller

[57] ABSTRACT

A device mountable on top of a truck cab so to automatically warn a truck driver if the truck body can clear underneath a bridge or other overhead structure; the device consisting of an upwardly telescopic rod that is adjustable to the height of the truck body or box and which, upon contact with any overhead object, will flex and bend over so to act as a switch arm of a switch for closing an electric circuit to either a light on the dashboard or other signalling device to the driver.

1 Claim, 4 Drawing Figures

U.S. Patent     Dec. 22, 1981     4,307,375
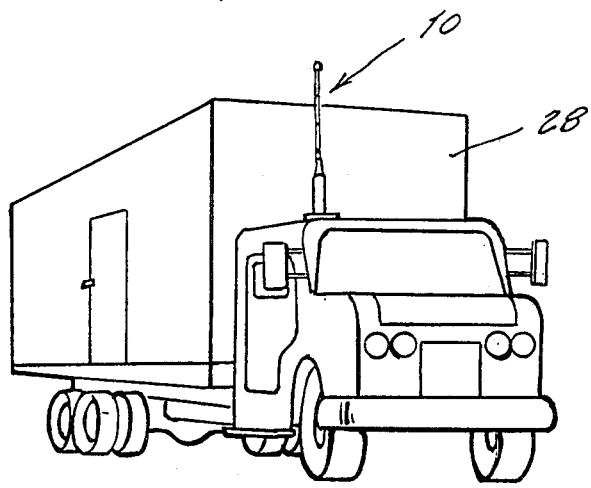
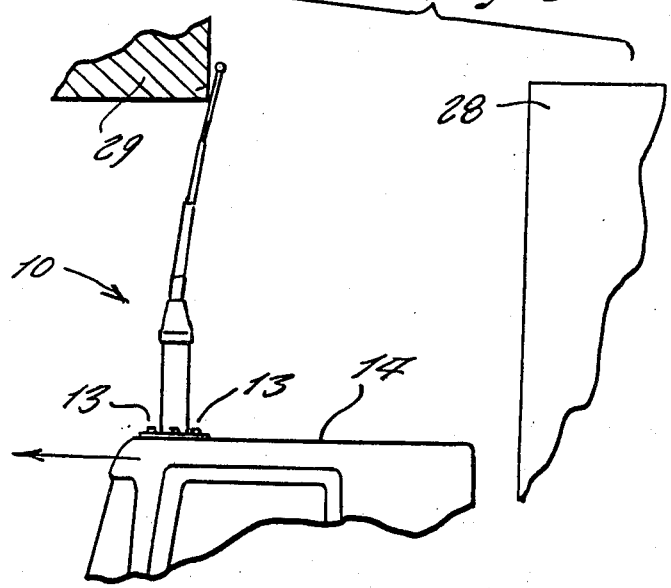
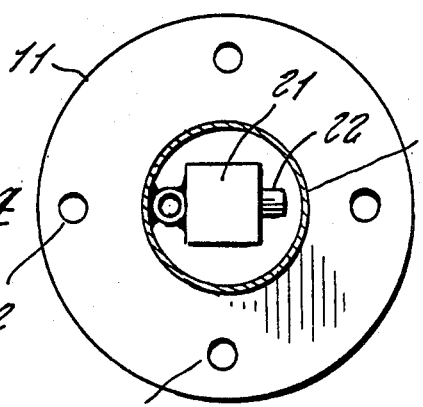
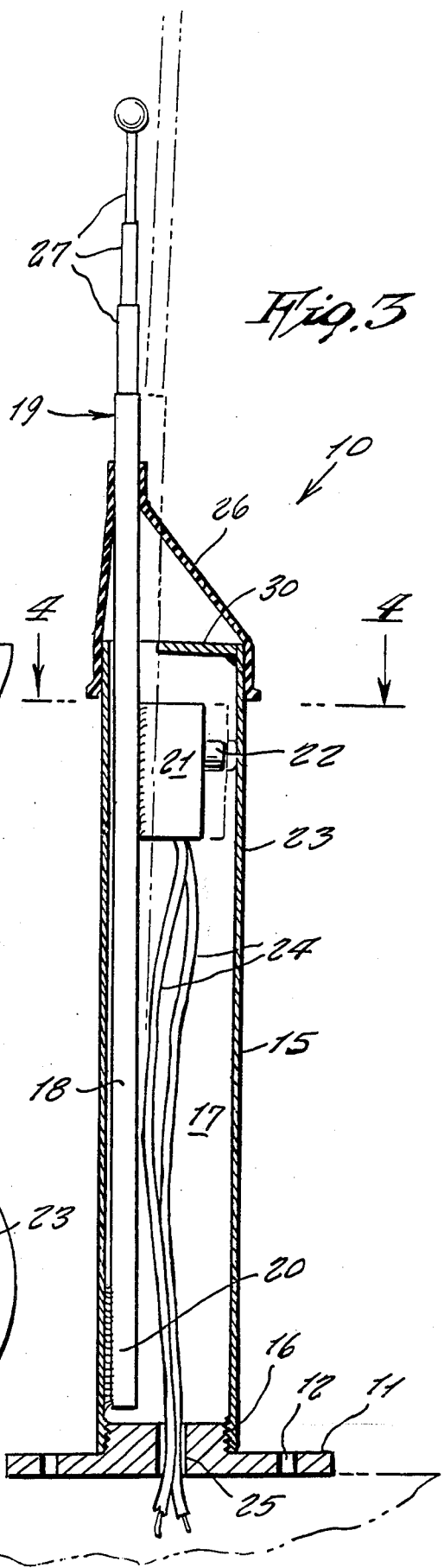

TOP WATCHER WARNING DEVICE FOR TRUCKS AND THE LIKE

CROSS REFERENCE TO RELATED APPLICATIONS

This application is a continuation in part of my copending application Ser. No. 662,329 filed Mar. 1, 1976, abandoned.

This invention relates generally to automotive truck accessories. More specifically it relates to vehicle warning devices.

It is well known that a great many trucks have a cab or body that is of considerable height so that the truck driver must consider whether the truck may pass under various low bridges along a route being travelled by the truck. Whenever clearances are close, the progress of the truck entering underneath my necessarily have to be slowed and time consuming with uncertaincy. This situation is objectionable and is, therefore, in want of an improvement.

Accordingly, it is a principal object of the present invention to provide a device mountable on top of a truck cab which will automatically warn a driver if the truck body cannot clear a low bridge or other overhanging object, without the necessity of the driver getting out of the cab so to see for himself.

Another object is to provide a warning device which can be used by trucks entering low loading docks, garage entrances or the like.

Still another object is to provide a warning device that is easily adjustable in height so that a single model is adaptable for use on all trucks or upon a vehicle that carries a variable height of cargo.

A further feature is that the device responds only to forces that are applied approximately from in front of the vehicle whereas most conventional devices respond to a force in any direction. Responses to a force from any direction is highly undesirable for instance, centrifugal force created on the rod when the vehicle makes a sharp turn at reasonable speeds or forces created by high gust crosswind could cause false warning signal if the device responded to forces in any direction. These false warning signals are inherently eliminated by the specific structure of this device.

Other objects are to provide a top watcher warning device for trucks and the like, which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a front perspective view of a truck showing the present invention mounted thereupon.

FIG. 2 is a fragmentary side view thereof shown in use hitting an overhead bridge or other abutment.

FIG. 3 is a side cross sectional view of the invention.

FIG. 4 is a cross sectional view on line 4—4 of FIG. 3.

Referring now to the drawing in detail, the reference numeral 10 represents a top watcher warning device according to the present invention wherein there is a base 11 having mounting holes 12 for receiving screws 13 in order that it may be mounted on top of a truck cab roof 14. A cylindrical sleeve 15 is screwed upon the base by screw thread 16. Within the interior 17 of the sleeve a lower end portion of the lowermost section 18 of a telescopic rod 19 is received and is attached at its lower end 20 to the sleeve by means of being bonded thereto. Within an upper portion of interior 17 there is an electric micro switch 21 bonded to a side of the section 18 so that a push button 22 of the switch is spaced away from the side wall 23 of the sleeve. The switch has electric conductors 24 extending therefrom downwardly and through a central opening 25 in the base 11, the conductors then extending through the roof 14 and into the cab where they are attached in series circuit with a buzzer on the dashboard and the vehicle battery power. Such circuit may additionaly be connected to a light inside the cab and also to the brake lights.

The upper end of section 18 protrudes upwardly out of the upper end of the sleeve, and an eccentrically conical shaped, flexible rubber boot 26 is fitted around the upper end of the sleeve and section 18 so to prevent rain water to enter interior 17.

In operative use, the upper sections 27 of the telescopic rod 19 are upwardly extendable in order that they may extend up to at least a height of a truck body 28 so that in case the truck attempts to move under a bridge 29 that is too low for the body, the telescopic rod will contact the bridge first and before the body strikes the same. When the rod 19 contacts the bridge or other overhead obstruction, it will be rearwardly flexed as the truck moves slightly ahead, as shown in FIG. 2. The rearwardly flexed rod will cause the switch button to engage the sleeve wall 23, so that the switch is actuated closing the circuit to the buzzer and other equipment for warning the driver to halt the vehicle instantly in order to prevent the body 28 from striking the bridge and damaging both.

As shown in FIG. 3, a partial top wall 30 welded to the sleeve serves as a stop limiting the pivotal flexing of section 18 thus preventing damage to the switch being crushed against the tube wall 23. It is understood that the warning device 10 can be mounted at either a left, right, center or any location upon the cab roof.

While certain novel features of this invention have been shown and described and are pointed out in the annexed claims, it will be understood that various omissions, substitutions and changes in the forms and detail of the device illustrated and in its operation can be made by those skilled in the art without departing from the spirit of the invention.

What is claimed is:

1. A top watcher warning device mountable upon a roof of a truck cab, said device comprising in combination a base having mounting opening holes, a tubular sleeve mounted upstanding upon said base, a telescopic rod placed tangentially along one side within said sleeve, a lower end of a lowermost section of said rod being bonded to said one side at a lower part thereof so as to position said rod eccentrically within said sleeve, an upper portion of said lowermost section protruding upwardly out of an upper end of said sleeve and a flexible rubber boot of upwardly eccentrically conical shape being fitted at its lower end around an upper end of said sleeve while a converged upper end thereof is fitted around said lower-most section upper portion which is substantially above said sleeve upper end, said boot closing said sleeve upper end; a microswitch within an upper portion of said sleeve being mounted on a side of said lowermost section which is opposite said side bonded to said sleeve, a button of said switch being positioned spaced from a side of said sleeve which is opposite to said sleeve side bonded to said lowermost section, said button engaging said sleeve opposite side when an upper portion of said rod is pivoted in a direction toward said sleeve opposite side, in response only to forces that are applied approximately from in front of said truck, a stop on upper end of said sleeve limiting said pivotal movement, said stop comprising a partial top wall of said sleeve, said switch being in electric circuit with a warning means on a dashboard of said truck cab, neither said rod nor said sleeve being included in the electric circuit, and said rod being upwardly telescopic to a full heights of a truck body behind said cab.

* * * * *